US008490162B1

(12) United States Patent
Popoveniuc et al.

(10) Patent No.: US 8,490,162 B1
(45) Date of Patent: Jul. 16, 2013

(54) SYSTEM AND METHOD FOR RECOGNIZING MALICIOUS CREDENTIAL GUESSING ATTACKS

(75) Inventors: Stefan Popoveniuc, Alexandria, VA (US); Cristian M. Ilac, Sammamish, WA (US); Gregory B. Roth, Seattle, WA (US); Eric J. Brandwine, Haymarket, VA (US)

(73) Assignee: Amazon Technologies, Inc., Reno, NV (US)

(*) Notice: Subject to any disclaimer, the term of this patent is extended or adjusted under 35 U.S.C. 154(b) by 4 days.

(21) Appl. No.: 13/248,736

(22) Filed: Sep. 29, 2011

(51) Int. Cl.
*G06F 21/00* (2006.01)

(52) U.S. Cl.
USPC ......... 726/5; 726/4; 726/19; 726/28; 713/182

(58) Field of Classification Search
None
See application file for complete search history.

(56) References Cited

U.S. PATENT DOCUMENTS

| | | | |
|---|---|---|---|
| 6,427,209 B1* | 7/2002 | Brezak et al. | 726/10 |
| 7,797,547 B2* | 9/2010 | Matsuoka et al. | 713/182 |
| 2006/0015938 A1* | 1/2006 | Wlodarczyk | 726/22 |
| 2006/0123478 A1* | 6/2006 | Rehfuss et al. | 726/22 |
| 2008/0294660 A1* | 11/2008 | Patterson et al. | 707/100 |
| 2009/0125986 A1* | 5/2009 | Kiester et al. | 726/4 |
| 2009/0327753 A1* | 12/2009 | Ferren et al. | 713/189 |
| 2010/0040067 A1* | 2/2010 | Hao et al. | 370/395.32 |
| 2011/0277016 A1* | 11/2011 | Hockings et al. | 726/4 |
| 2012/0201372 A1* | 8/2012 | Eck | 380/2 |

OTHER PUBLICATIONS

Microsoft Windows Server, TechNet Library, "Account Lockout and Password Concepts", Jul. 31, 2004, 6 pages, http://technet.microsoft.com/en-us/library/cc780271(WS.10).aspx.*
Clercq, "Understanding Windows' Account Lockout Security Feature", Windows IT Pro, http://windowsitpro.com/windows/understanding-windows-account-lockout-security-feature, 3 pages, Sep. 2, 2005.*

* cited by examiner

*Primary Examiner* — Hadi Armouche
(74) *Attorney, Agent, or Firm* — Baker Botts L.L.P.

(57) ABSTRACT

A system includes a memory and a processor. The memory is operable to store a credential verifier associated with a user account and a counter. The processor is coupled to the memory and the memory includes executable instructions that cause the system to receive a first authentication attempt and increment the counter if validation of the first authentication attempt against the credential verifier fails. The instructions also cause the system to receive a second authentication attempt and increment the counter only if validation of the second authentication attempt against the credential verifier fails and the second authentication attempt is distinct from the first authentication attempt.

24 Claims, 6 Drawing Sheets

| | Account | Attempted Credential | Timestamp | Successful | Distinct Counter | Lifetime Counter | ... |
|---|---|---|---|---|---|---|---|
| 214a | Account1 | password | 8:03 | N | 1 | 1 | ... |
| 214b | Account1 | PASSWORD | 8:04 | N | 2 | 2 | ... |
| 214c | Account1 | PASSWORD1 | 8:05 | Y | 0 | 2 | ... |
| 214d | Account1 | password | 11:10 | N | 1 | 2 | ... |
| 214e | Account1 | password1 | 11:11 | N | 2 | 3 | ... |
| 214f | Account1 | password2 | 11:12 | N | 3 | 4 | ... |
| 214g | Account1 | Password | 11:13 | N | 4 | 5 | ... |
| 214h | Account1 | Password1 | 11:15 | N | 5 | 6 | ... |
| 214i | Account2 | houston | 11:45 | N | 1 | 1 | ... |
| | ... | ... | ... | ... | ... | ... | ... |

*FIG. 2*

SYSTEM AND METHOD FOR RECOGNIZING MALICIOUS CREDENTIAL GUESSING ATTACKS

BACKGROUND

An enterprise may offer a variety of services to a user. Some of these services may require the authentication of user credentials before access is granted to the services. To prevent a malicious entity from guessing the correct user credentials, an enterprise may limit the number of incorrect attempts at authentication to a specific number. However, this may lead to freezing out a user, from a user account, that made honest mistakes when entering credentials.

BRIEF DESCRIPTION OF THE DRAWINGS

For a more complete understanding of the present disclosure and its advantages, reference is made to the following descriptions, taken in conjunction with the accompanying drawings in which:

FIG. 2 illustrates example attempted user credentials data, which may be used by the example systems of FIG. 1, 4, or 5 for differentiating between malicious password guessing and honest mistakes, according to certain embodiments of the present disclosure;

DETAILED DESCRIPTION

Enterprises often provide their users with access to a variety of services that meet the needs and demands of each user. For example, an enterprise may desire to process transactions, store data, or host a website. Before granting a user access to these services, an enterprise may wish to authenticate a user's user credentials. For a variety of reasons that may go against the interests of the enterprise, a malicious user may wish to also access these particular services. Therefore, an enterprise may wish to make its service environment more secure by implementing various security measures. One security measure may be to limit the number of failed log-on attempts allowed for a particular user account. One purpose of this limit is to prevent a malicious entity from randomly guessing user credentials for a particular account by using an automated computer program or other means. This results in a large number of authentication attempts using distinct user credentials. However, the enterprise may have no way to differentiate between a malicious user entering numerous distinct user credentials and a bona fide user that is mistakenly entering the wrong user credentials, some of which may be identical. Because both sets of users are treated the same, the enterprise may face the problem of bona fide users locking themselves out through actions that pose no actual security risk. By differentiating between malicious activity and some form of inadvertent activity that poses no actual threat it becomes possible to set more sensitive thresholds to lock out malicious password guessing more quickly.

Certain embodiments of the present disclosure provide techniques for differentiating between malicious password guessing and honest user mistakes. FIGS. 1 through 7 below illustrate systems and methods for differentiating between malicious password guessing and honest user mistakes.

Figure 1:
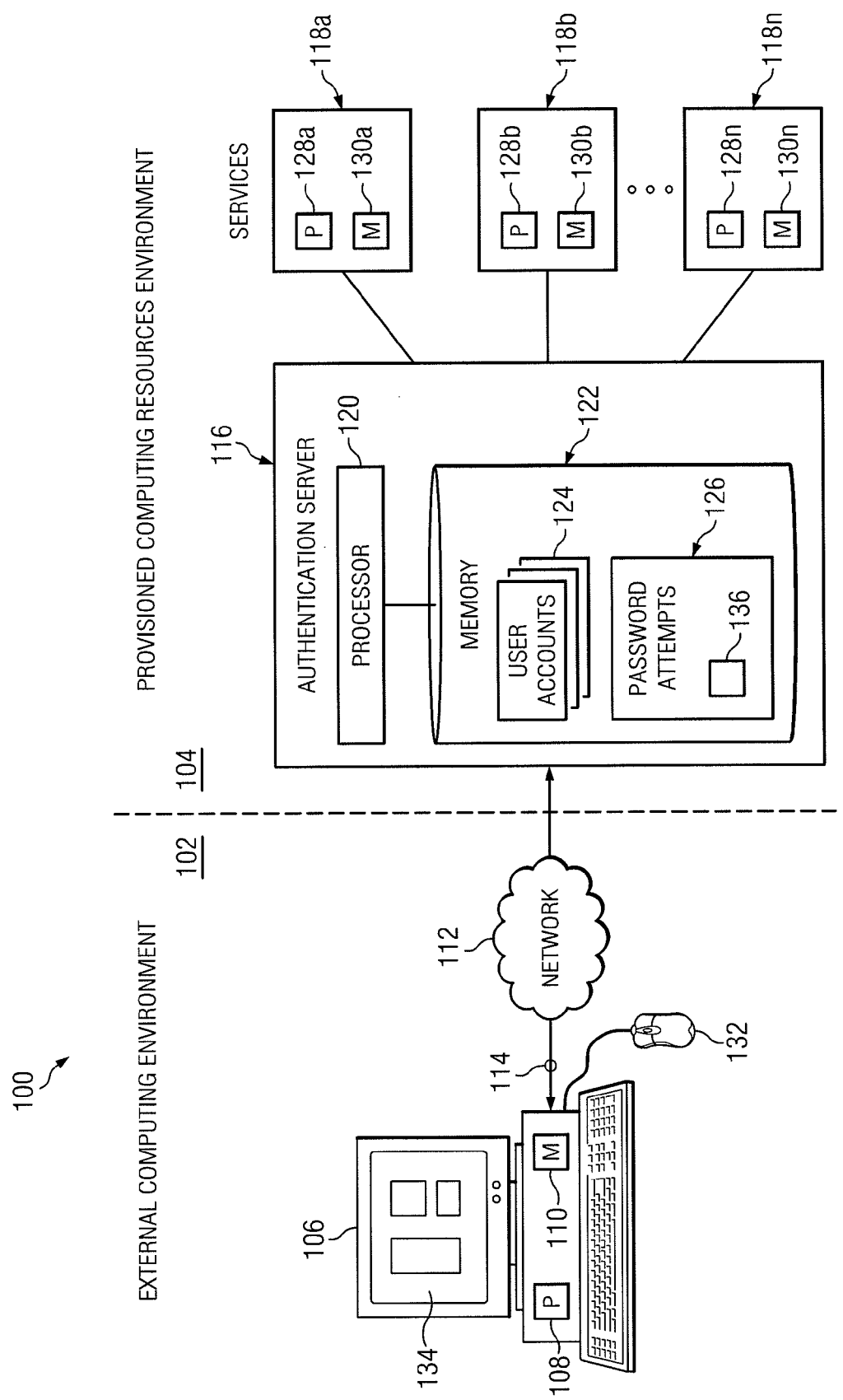
FIG. 1 illustrates an example system for differentiating between malicious password guessing and honest mistakes.

FIG. 1 illustrates an example system for differentiating between malicious password guessing and honest mistakes. In the illustrated example, credentials verification system 100 includes external computing environment 102 and provisioned computing resources environment 104. Although credentials verification system 100 is illustrated and primarily described as including particular components, the present disclosure contemplates credentials verification system 100 including any suitable components, according to particular needs.

Generally, credentials verification system 100 may be comprised of external computing environment 102 and provisioned computing resources environment 104. A user in external computing environment 102 may attempt to access service 118 in provisioned computing resources environment 104. To access service 118, provisioned computing resources environment 104 may need to authenticate the user. Therefore, a user may have to enter user credentials in external computing environment 102 before being granted access to service 118.

External computing environment 102 may include computer 106 and network 112. In general, computer 106 may be any computing device capable of receiving user input. For example, computer 106 may be a personal computer, laptop, workstation, telephone, electronic notebook, electronic book reader, tablet computer, Personal Digital Assistant (PDA), pager, or any other suitable device (wireless, wireline, or otherwise), component or element capable of receiving, processing, storing, and/or communicating data to other components of credentials verification system 100. More specifically, computer 106 may comprise processor 108, memory 110, input device 132, and GUI 134. Processor 108 may include one or more microprocessors, controllers, or any other suitable computing devices or resources. Processor 108 may work, either alone or with components of credentials verification system 100, to provide a portion or all of the functionality of credentials verification system 100 described herein. Processor 108 communicatively couples to memory 110. Memory 110 may take the form of volatile or non-volatile memory including, without limitation, magnetic media, optical media, RAM, ROM, removable media, or any other suitable memory component.

In certain embodiments, memory 110 may be internal or external to processor 108 and may include one or more instruction caches or one or more data caches. Instructions in the instruction caches may be copies of instructions in memory 110, and the instruction caches may speed up retrieval of those instructions by processor 108. Data in the data caches may include any suitable combination of copies of data in memory 110 for instructions executing at processor 108 to operate on; the results of previous instructions executed at processor 108 for access by subsequent instructions executing at processor 108, or for writing to memory 110; and other suitable data. The data caches may speed up read or write operations by processor 108.

In certain embodiments, computer 106 may include input device 132. Input device 132 allows the user to interact with computer 106 to input, store, delete, modify, or access data, or perform any other processing tasks. For example, input device 132 may be one or more of the following: a mouse, keyboard, touchpad, multi-touch interface, touchscreen, stylus, keypad, microphone, camera or any input device that allows the user to interact with computer 106.

In some embodiments, computer 106 may comprise graphical user interface (GUI) 134. GUI 134 is generally operable to tailor and filter data presented to a user. GUI 134 may provide a user with an efficient and user-friendly presentation of information regarding the various components of credentials verification system 100. GUI 134 may comprise a plurality of displays having interactive fields, pull-down lists, and buttons operated by the user. GUI 134 may include multiple levels of abstraction including groups and boundaries. In certain embodiments, GUI 134 may also operate as input device 132 allowing the user to use a touch interface to interact with computer 106.

A user may use various components of computer 106 to enter user credentials to be authenticated before being granted access to services 118. For example, GUI 134 of computer 106 may display a prompt to the user to enter user credentials. User credentials may be any data that can authenticate a particular user to provisioned computing resources environment 104. For example, user credentials may be one or more of the user's name, a username, a password, an account name, a personal identification number, a social security number, a credit card number, any combination thereof, or any other data that can identify a user. In certain embodiments, user credentials may be the combination of a username and a password.

Once a user has entered user credentials, computer system 106 may communicate message 114 over network 112 to authentication server 116. Message 114 may contain the attempted user credentials, or it may contain information derived from the attempted user credentials, and a request to access service 118 of provisioned computing resources environment 104.

Network 112 facilitates wireless or wireline communication. Network 112 may communicate, for example, IP packets, Frame Relay frames, Asynchronous Transfer Mode cells, voice, video, data, and other suitable information between network addresses. Network 112 may include one or more personal area networks (PANS), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

In general, provisioned computing resources environment 104 (including, for example, one or more of services 118 and authentication server system 116) provides a collection of computing services over a network (which may or may not be network 112). Those computing services may include any suitable combination of, for example, storage, computer processing, networking, applications, power, or any other suitable computing resource that may be made available over a network. In certain embodiments, one or more of those services may be provided by service 118. Service 118 may be any software, hardware, firmware, or combination thereof capable of providing a user with a computing service as required by particular needs. For example, service 118a may be a database service and service 118b may be a data storage service. In some embodiments, service 118 may comprise processor 128 and memory 130. Processor 128 may include one or more microprocessors, controllers, or any other suitable computing devices or resources. Processor 128 may work, either alone or with components of credentials verification system 100, to provide a portion or all of the functionality of credentials verification system 100 described herein. Processor 128 communicatively couples to memory 130. Memory 130 may take the form of volatile or non-volatile memory including, without limitation, magnetic media, optical media, RAM, ROM, removable media, or any other suitable memory component.

In certain embodiments, memory 130 may be internal or external to processor 108 and may include one or more instruction caches or one or more data caches. Instructions in the instruction caches may be copies of instructions in memory 130, and the instruction caches may speed up retrieval of those instructions by processor 128. Data in the data caches may include any suitable combination of copies of data in memory 130 for instructions executing at processor 108 to operate on; the results of previous instructions executed at processor 128 for access by subsequent instructions executing at processor 128, or for writing to memory 130; and other suitable data. The data caches may speed up read or write operations by processor 128.

Generally, authentication server 116 receives user credentials and determines whether a particular user's user credentials are valid. If the user credentials are valid, then authentication server 116 may confirm the user as authorized to access service 118. Authentication sever 116 also may determine if a malicious entity is attempting to gain access to provisioned computing resources environment 104 by password guessing or if a bona fide user is merely inputting incorrect user credentials. In particular, authentication server 116 comprises processor 120 and memory 122. Processor 120 may include one or more microprocessors, controllers, or any other suitable computing devices or resources. Processor 120 may work, either alone or with components of credentials verification system 100, to provide a portion or all of the functionality of credentials verification system 100 described herein. Processor 120 communicatively couples to memory 122. Memory 122 may take the form of volatile or non-volatile memory including, without limitation, magnetic media, optical media, RAM, ROM, removable media, or any other suitable memory component.

In certain embodiments, memory 122 may be internal or external to processor 108 and may include one or more instruction caches or one or more data caches. Instructions in the instruction caches may be copies of instructions in memory 122, and the instruction caches may speed up retrieval of those instructions by processor 120. Data in the data caches may include any suitable combination of copies of data in memory 122 for instructions executing at processor 120 to operate on; the results of previous instructions executed at processor 122 for access by subsequent instructions executing at processor 120, or for writing to memory 122; and other suitable data. The data caches may speed up read or write operations by processor 120. Although depicted separately and individually in FIG. 1 for illustrative purposes, the functionality and capabilities of processors 120 and 128 may be included in a single processor or multiple processors.

Similarly, although memories 122 and 130 are depicted separately and individually in FIG. 1 for illustrative purposes, the functionality and capabilities of memories 122 and 130 may be included in a single memory or multiple memories.

In response to receiving message 114, authentication server 116 may facilitate communication between processor 120 and memory 122 to initiate the authentication of the attempted user credentials. In certain embodiments, authentication server 116 may initiate the authentication of the attempted user credentials by accessing user accounts 124. User accounts 124 is a collection of user credentials associated with user accounts. For example, a particular user account 124 may comprise a unique user account identifier in addition to user credentials. In certain embodiments, the unique user account identifier may be a part of the user credentials. User accounts 124 may be stored in one or more text files, tables in a relational database, or any other suitable data structure capable of storing information. Authentication server 116 may use the attempted user credentials to retrieve a particular user account 124. Authentication server 116 may then compare the attempted user credentials to the user credentials of the particular user account 124. For example, in certain embodiments, authentication server 116 may use a username in the attempted user credentials to retrieve a particular user account 124 and then compare a password in the attempted user credentials to the password associated with user account 124. If the attempted user credentials match the user credentials of user account 124, then authentication server 116 may deem the user as authenticated and grant access to service 118.

For particular attempted user credentials, authentication server 116 may store the attempted user credentials in memory 122. In the illustrated embodiment, authentication server 116 may store the attempted user credentials as part of password attempts 126. Password attempts 126 is a collection of user credentials communicated to authentication server 116. In certain embodiments, authentication server 116 may store all attempted user credentials. In certain embodiments, authentication server 116 may store only select user credentials. Attempted user credentials may be stored in one or more text files, tables in a relational database, or any other suitable data structure capable of storing information. For example, password attempts 126 may be a table in a relational database. Although the example of storing password attempts is given, any attempted user credential may be stored in password attempts 126, as required by particular needs of credentials verification system 100. In certain embodiments, the information stored in password attempts 126 may be user account identifiers, attempted user credentials, time and date of attempted user credentials, result of authentication of attempted user credentials, one or more counters 136, or any other information that may be helpful in determining whether credentials verification system 100 is being accessed by a bona fide user or a malicious entity.

In certain embodiments, to enable authentication server 116 to scale, to improve security, and to perform well in the face of large numbers of correct and malicious users, it can be useful to store only enough information to determine whether an authentication attempt constitutes a distinct attempted credential rather than storing every authentication attempt. For example, by associating a bloom filter with a counter for each credential verifier in credentials verification system 100, authentication server 116 can determine whether an attempted credential is new (and then insert it into the bloom filter and increment the associated counter) in fixed space and time for an effectively unlimited number of attempted credentials. In other words, authentication server 116 may attempt to match a particular attempted credential of the authentication attempt against the bloom filter and if the match fails, the attempted credential may be determined to be distinct and a representation of the attempted credential is stored using the bloom filter (which may be stored in memory 122) for the associated credential verifier. If the match is successful, the representation of the attempted credential is already in the bloom filter and need not be stored using the bloom filter. As known by one skilled in the art, the representation of an object stored into the bloom filter (here the attempted credential) can be generated by executing a desired number of hashes to set the appropriate bits in a bit vector of the bloom filter. The same hashes are then applied to the attempted credentials of later authentication attempts and the resulting bits are compared to the bits that already are stored in the bit vector of the bloom filter. If the bits match (success), then the attempted credential is likely not distinct, according to a probabilistic function, from previously attempted credentials. If the bits do not match (fail), then the attempted credential is distinct from previously attempted credentials.

In addition to storing the attempted user credentials in password attempts 126, authentication server 116 may determine whether the attempted user credentials are distinct for the particular user account 124. For example, authentication server 116 may determine whether the attempted user credentials are distinct by utilizing a Bloom filter. In certain embodiments, authentication server 116 may have counter 136 keeping track of distinct attempted user credentials for a particular user account 124. For example, counter 136 may be a field in password attempts 126. Authentication server 116 may compare the attempted user credentials against the user credentials associated with the particular account. If the attempted user credentials are distinct from the user credentials associated with the particular account, authentication server 116 may compare the attempted user credentials with other previously attempted user credentials for the particular account. In certain embodiments, if authentication server 116 determines the attempted user credentials are distinct from all previously attempted user credentials, then authentication server 116 may increment a counter 136 associated with the particular user account 124. Authentication server 116 makes the determination of whether one user credential is distinct from another user credential based on a predefined user credential policy of provisioned computing resources environment 104. For example, if the predefined user credential policy is case-sensitive, then similar user credentials of different cases, such as the words "TEST" and "test," may be determined to be distinct. However, if the predefined user credential policy is not case-sensitive, then the user credentials of "TEST" and "test" may be determined not to be distinct. Once authentication server 116 determines that the attempted user credentials are distinct for a particular user account 124, authentication server 116 may increment counter 136 keeping track of distinct user credential attempts. If authentication server 116 determines that the attempted user credentials are not distinct to the correct user credentials associated with user account 124 or to previously attempted user credentials, then authentication server 116 may not increment counter 136 keeping track of distinct user credential attempts; thus counter 136 remains in its current state.

In certain embodiments, authentication server 116 may track particular attempted user credentials being attempted for distinct user accounts 124. For example, a malicious user may have discovered a correct password, but not the particular user account 124 associated with that password. Thus, the malicious user may enter the same password for various user accounts 124. In such embodiments, authentication server 116 may store attempted user credentials in password attempts 126 or in another data structure capable of holding information in memory 122. For every distinct user account 124 attempted for a particular attempted user credential, authentication server 116 may increment counter 136. If authentication server 116 determines an attempted user account 124 is not distinct to a particular attempted user credential, then authentication server 116 may not increment the counter 136 associated with the particular attempted user credential; thus the counter remains in its current state.

In certain embodiments, authentication server 116 may associate multiple counters 136 for each user account 124. For example, there may be one counter, which is an instance counter, that keeps track of distinct attempted user credentials within a specific time period while a second counter, that is a lifetime counter, may keep track of distinct attempted user credentials over the lifetime of the particular user account 124. An example of a counter that keeps track of distinct attempts over a specific time period may be that counter 136 keeps track of distinct attempted user credentials since the last successful authentication of a particular user account 124. In such an embodiment, authentication server 116 may determine that particular attempted user credentials may be distinct when comparing the particular attempted user credentials with all other attempted user credentials for that particular account since the last successful authentication for that particular account, and, thus, may increment the instance counter. However, authentication server 116 may determine that the particular attempted user credentials may not be distinct when comparing the particular attempted user credentials with all other attempted user credentials for that particular account over the lifetime of that particular account. In that instance, authentication server 116 may not increment a lifetime counter, thus the counter remains in its current state. If authentication server 116 determines that the attempted user credentials match the user credentials associated with the particular user account 124, then authentication server 116 may reset an instance counter associated with the particular user account 124. For example, authentication sever 116 may reset the instance counter to 0.

In certain embodiments, authentication server 116 may have threshold values for counters 136 associated with user accounts 124. For example, a threshold value may be a number predefined by an administrator of provisioned computing resources environment 104 to determine whether the attempted user credentials that are being received are from a bona fide user that may be entering the user credentials incorrectly or by a malicious entity trying to guess the password to gain unauthorized access to provisioned computing resources environment 104. When a certain counter 136 associated with a particular user account 124 reaches or exceeds the threshold value, then a remediation action based on a security policy may be triggered. An example of a security policy may be to lock user accounts 124 that have at least one counter 136 that has exceeded the threshold value until further action by the user is taken. Examples of further action is changing user credentials associated with user account 124, entering information in addition to user credentials, or replying to security questions. Another example of a security policy is contacting the user associated with a particular user account 124 regarding numerous incorrect attempted user credentials. The user may be contacted via phone, email, text message, or any other method of communication. A further example of a security policy is presenting the user with a CAPTCHA test that is relatively easy for human users to solve but is difficult for computers to solve. For example, one example CAPTCHA test can require the user to input a series of text characters that are displayed in a distorted image in addition to user credentials. Requiring the user to correctly answer the CAPTCHA prompt may serve the purpose of determining whether the user is really a malicious automated entity, or a malicious human-aided entity, incapable of correctly answering a CAPTCHA test. The security policy may be any one of the previous examples, a combination of the previous examples, or any other security policy suitable for particular needs of provisioned computing resources environment 104.

The term "user credentials" is not meant to limit a particular embodiment to a specific type or format of user credentials. Credentials verification system 100 is capable of processing any variation of user credentials in any particular operation of the example system. The present disclosure contemplates credentials verification system 100 possessing the flexibility to accommodate any combination of user credentials as required by particular needs. In certain embodiments, user credentials may be one of four varieties: credential, authentication claim, credential verifier, and credential identifier.

A credential may be user credentials that have not had any function(s) applied yet. For example, if a user has a password associated with a user account, the credential may be the actual clear text password. Certain components of credentials verification system 100 may access, communicate, store, or otherwise process user credentials as a credential. An authentication claim may be data, such as a text string, derived from attempted user credentials presented during an authentication attempt. For example, the authentication claim may be the result of applying a hash function to attempted user credentials. Certain components of credentials verification system 100 may access, communicate, store, or otherwise process user credentials as an authentication claim. A credential verifier may be data, such as a text string, that is sufficient to verify an authentication claim. A credential verifier may be the result of applying one or more functions, algorithms, routines, and/or procedures or any other suitable process according to particular needs to a credential. For example, a credential verifier may be the result of applying a second hash function to the result of applying a first hash function to the credential. The first and second hash functions may or may not be the same hash function. Certain components of credentials verification system 100 may access, communicate, store, or otherwise process user credentials as a credential verifier. In certain embodiments, credentials verification system 100 may compare some variation of attempted user credentials against the credential verifier to determine the validity of the user credentials during authentication.

A credential identifier is the result of applying a function to the authentication claim such that for two authentication claims derived from the same credential, the credential identifiers of those two authentication claims will have the same value. For example, an authentication claim may be the result of applying a first hash function to an attempted user credential. The credential identifier may be the result of applying a second hash function to that authentication claim. The first and second hash functions may or may not be the same hash functions. Certain components of credentials verification system 100 may access, communicate, store, or otherwise process user credentials as a credential identifier. In certain embodiments, credentials verification system 100 may compare the credential identifier against a credential verifier to determine whether particular attempted user credentials are valid. According to some embodiments, credentials verification system 100 may compare a credential identifier to previously stored credential identifiers to determine whether the credential identifier is distinct from previously stored credential identifiers.

In a particular embodiment, credentials verification system 100 may receive an authentication attempt. The authentication attempt may comprise an authentication claim. The authentication claim may be the result of a function applied to attempted user credentials. Credentials verification system 100 may determine the validity of the authentication attempt by comparing the credential identifier of the authentication attempt to a stored credential verifier associated with a user account. The credential identifier may be the result of a function applied to the authentication claim. If validation of the authentication attempt succeeds, the user may be authenticated. If validation fails, credentials verification system 100 may compare the credential identifier to previously stored credential identifiers. For example, credentials verification system may use a Bloom filter to determine if the credential identifier is distinct from other credential identifiers. If credentials verification system 100 determines that the credential identifier is distinct from previously stored credential identifiers for a particular user account, credentials verification system 100 may increment an appropriate counter.

Any component of credentials verification system 100 may include an interface, logic, memory, and/or other suitable elements. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of credentials verification system 100.

Certain embodiments of the present disclosure may provide some, none, or all of the following technical advantages. For example, certain embodiments can differentiate between the password guessing of a malicious entity from a bona fide user that has mistakenly entered incorrect user credentials a few times by mistake. This can provide provisioned computing resources environment 104 with improved security and protection from malicious attacks while avoiding unnecessarily preventing bona fide users from accessing various services 118 of provisioned computing resources environment 104. This can help prevent a bona fide user from being frustrated from being unnecessarily locked out of his or her user account. Because certain embodiments may be able to more accurately detect malicious attacks, the resources required to address potential malicious attacks will be used more sparingly, improving efficiency and cutting costs associated with securing provisioned computing resources environment 104. Another advantage of certain embodiments is the heightened security and protection from a malicious entity learning of a correct user credential and then applying it to various user accounts to determine which account the user credentials may authorize. In certain embodiments, provisioned computing resources environment 104 may increase security by being able to detect a malicious entity that only guesses user credentials for a particular user account 124 over a prolonged period of time in hopes of avoiding triggering a time based user credential attempt limit.

Figure 4:
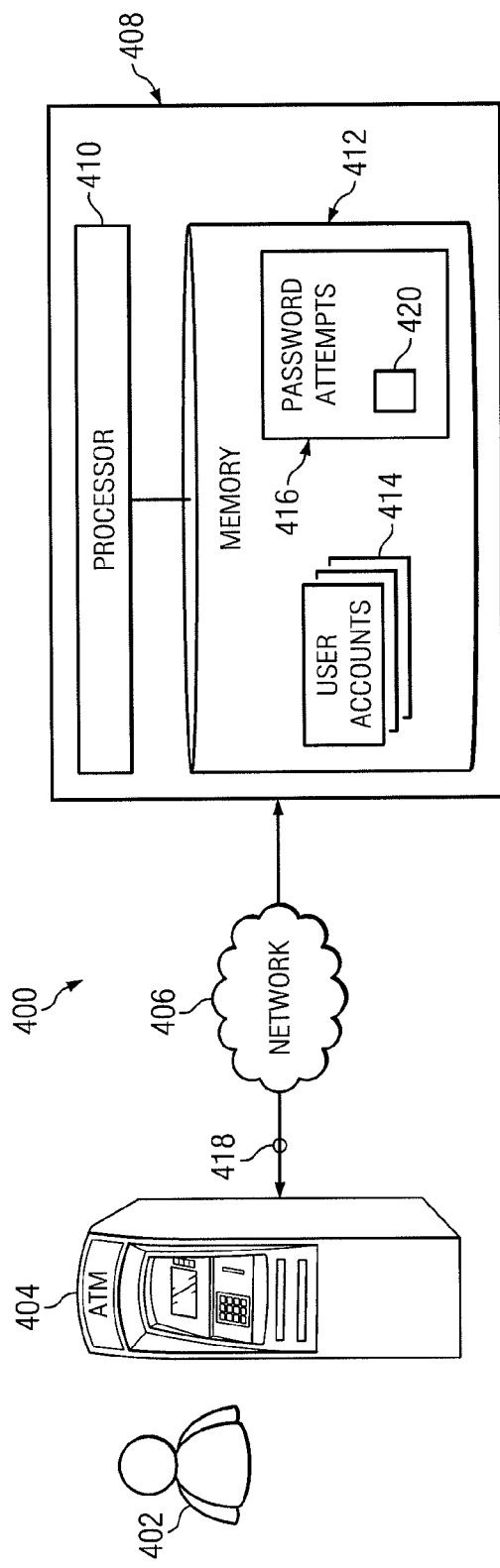
FIG. 4 illustrates an example system for differentiating between malicious password guessing and honest mistakes.
Figure 5:
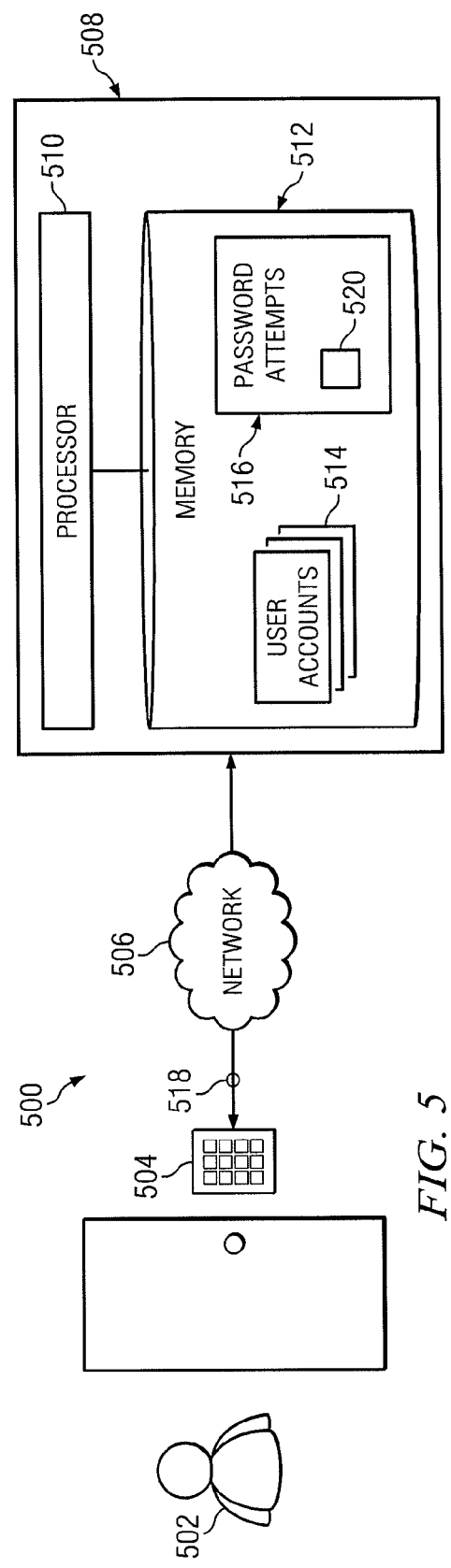
FIG. 5 illustrates an example system for differentiating between malicious password guessing and honest mistakes.

FIG. 2 illustrates example attempted user credentials data, which may be used by the example systems of FIG. 1, 4, or 5 for differentiating between malicious password guessing and honest mistakes, according to certain embodiments of a present disclosure. Each attempted user credentials data entry corresponds to attempted user credentials. An example data set of FIG. 2 is attempted user credentials data 200, which represents attempted user credentials logged by authentication server 116. It should be understood that attempted user credentials data 200 is provided for example purposes only. The example attempted user credentials data 200 will be described with reference to example credentials verification system 100. Attempted user credentials data 200 is depicted as having a tabular structure for illustrative purposes only. Attempted user credentials data 200 can be stored in a text file, a table in a relational database, a spreadsheet, a hash table, a linked list, or any other suitable data structure capable of storing information. In certain embodiments, attempted user credentials data may be stored in password attempts 126. Each entry in attempted user credentials data 200 may or may not be assigned a unique identifier. It should be noted that although only clear text values readable by humans are shown in attempted user credentials data 200, credentials verification system 100 is capable of accommodating a variety of formatted data values including encrypted data values for increased security.

As an example, attempted user credentials data 200 of FIG. 2 may be discussed in conjunction with various components of the example system 100 of FIG. 1. Attempted user credentials data 200 of FIG. 2 may also be implemented in the example system 400 of FIG. 4 or the example system 500 of FIG. 5.

Generally, attempted user credentials data 200 contains various details about attempted user credentials received by authentication server 116. Attempted user credentials data 200 can contain any information about attempted user credentials that may be used to differentiate between malicious password guessing and honest mistakes by credentials verification system 100. For example, attempted user credentials data 200 may contain account identifier 202, attempted user credential 204, timestamp 206, result of authentication 208, distinct counter 210, and lifetime counter 212. Records 214 are example entries of attempted user credentials data 200 where each record 214 corresponds to a particular attempt at using user credentials in credentials verification system 100. Although nine records 214 are illustrated, attempted user credentials data 200 can contain as many or as few records 214 as required to fulfill particular needs. Similarly, although only six data elements, depicted in the current example as columns, are shown in attempted user credentials data 200, attempted user credentials data 200 can contain as many or as few data elements are required to fulfill particular needs.

In certain embodiments, account identifier 202 is a unique identifier that references a particular user account 124. Account identifier 202 may be a number, text string, or any other identifier capable of identifying a particular user account 124. In the current example, records 214 all include a text string as account identifier 202. For example, records 214a through 214h contain account identifier 202 for "Account1" which may be a reference to the same particular user account 124. Record 214i contains account identifier 202 for "Account2" which may be a reference to a different user account 124.

In certain embodiments, attempted user credential 204 represents a user credential that may have been entered in order to request authentication in credentials verification system 100. For example, attempted user credential 204 may be a user's name, a username, a password, an account name, a personal identification number, a social security number, a credit card number, any combination thereof, or any other data that can identify a user. In the illustrated example, record 214a contains attempted user credential 204 of "password" and record 214b contains attempted user credential 204 of "PASSWORD."

In certain embodiments, timestamp 206 represents a specific time that a particular user credential was attempted. For example, timestamp 206 may be a sequence of characters denoting a date and/or time. Timestamp 206 may be in any format for the date and/or time as require by particular needs. In certain embodiments, timestamp 206 may be formatted according to the ISO 8601 time and date format. In certain embodiments, timestamp 206 may be the number of seconds since the UNIX epoch (defined as Jan. 1, 1970) until a user credential was attempted. In the illustrated example, timestamp 206 is depicted as time formatted in a human-readable format. For example, record 214a contains timestamp 206 of "8:03" and record 214b contains timestamp 206 of "8:04."

In certain embodiments, result of authentication 208 represents whether or not an attempted user credential was successfully authenticated. Examples of result of authentication 208 may be a single binary digit, a number, a single character, a string of characters, or any other result of authentication 208 that is capable of denoting successful attempted user credentials from unsuccessful user credentials. For example, in the current example, result of authentication 208 contains a single letter: the letter "N" denoting an unsuccessful user credential or the letter "Y" denoting a successful user credential. For example, record 214a contains result of authentication 208 of "N" denoting an unsuccessful user credential attempt and record 214c contains result of authentication 208 of "Y" denoting a successful user credential attempt.

Generally, attempted user credentials data 200 may include one or more counters to keep track of distinct attempted user credentials. In the illustrated example, attempted user credentials data 200 includes two counters: distinct counter 210 and lifetime counter 212. In the illustrated example, distinct counter 210 may be initialized when user account 124 is created or when a first attempted user credential for a particular account is received. For example, distinct counter 210 may keep track of distinct attempted user credentials since the last successful attempted user credentials. For example, in the illustrated example, distinct counter 210 keeps track of distinct attempted user credential 204 since the last time result of authentication 210 was successful, or equal to "Y." In certain embodiments, distinct counter 210 may track distinct attempted user credentials 204 since the last successful attempted user credential, within the last hour, within the last day, or any other timeframe. As an example of distinct counter 210 behavior, if a successful attempted user credential is entered for account 124, then distinct counter 210 may be reset to zero.

In certain embodiments, lifetime counter 212 may track the total number of distinct attempted user credentials 204 since user account 124 was created. In the illustrated example, record 214a represents a user that entered attempted user credential 204 of "password" for account identifier 202 of "Account1" at a time depicted as timestamp 206 of "8:03." Because attempted user credential 204 was incorrect, result of authentication 208 is "N" or unsuccessful. Authentication server 116 determines that attempted user credential 204 of "password" is distinct to all previous attempted user credentials 204 for account identifier 202 since the last successful attempted user credential and increments distinct counter 210 to "1." Authentication server 116 may also determine that attempted user credential 204 of "password" is distinct to all previous attempted user credentials 204 for account identifier 202 over the lifetime of account identifier 202 and thus increments lifetime counter 212 to "1" as well. Record 214b is another example of an unsuccessful attempted user credential 204. The distinct attempted user credential 204 of "PASSWORD" was entered and was determined to be unsuccessful and distinct counter 210 and lifetime counter 212 were incremented accordingly to "2."

Record 214c is an example illustration of record 214 with a successful attempted user credential. In the illustrated example, record 214c represents a user that entered attempted user credential 204 of "PASSWORD1" for account identifier 202 of "Account1" at a time depicted as timestamp 206 of "8:05." Because attempted user credential 204 was correct, result of authentication 208 is "Y" or successful. Authentication server 116 determines that attempted user credential 204 of "PASSWORD1" is correct for account identifier 202 and may reset distinct counter 210 to "0" but may not reset lifetime counter 212 which may remain in a current state.

Record 214d is an example illustration of record 214 with an unsuccessful attempted user credential entered after a successful attempted user credential. In the illustrated example, record 214d represents a user that entered attempted user credential 204 of "password" for account identifier 202 of "Account1" at a time depicted as timestamp 206 of "11:10." Because attempted user credential 204 was incorrect, result of authentication 208 is "N" or unsuccessful. Authentication server 116 determines that attempted user credential 204 of "password" is a distinct attempted user credential 204 since the last successful attempted user credential, and increments distinct counter 210 from "0" to "1." Authentication server 116 may determine that attempted user credential 204 of "password" is not distinct over the lifetime of account identifier 202 of "Account1" because record 214a also had attempted user credential 204 of "password." Thus authentication server 116 may not increment lifetime counter 212, which may remain in a current state.

In certain embodiments, there may be a threshold value for each counter of example attempted user credentials data 200. When a particular counter reaches its associated threshold value, then credentials verification system 100 may initiate a security policy. For example, example record 214h has distinct counter 210 entry of "5" and lifetime counter 212 entry of "6." An administrator of credentials verification system 100 may have preset a threshold value of five for distinct counter 210 which may trigger a security policy and a threshold value of ten for lifetime counter 212 which may trigger a different security policy. In this example, because distinct counter 210 is at "5" for record 214h, a security policy may have been triggered. However, because the threshold value for lifetime counter 212 is ten, the lifetime counter 212 entry of "6" is not high enough to trigger the second security policy.

Figure 3:
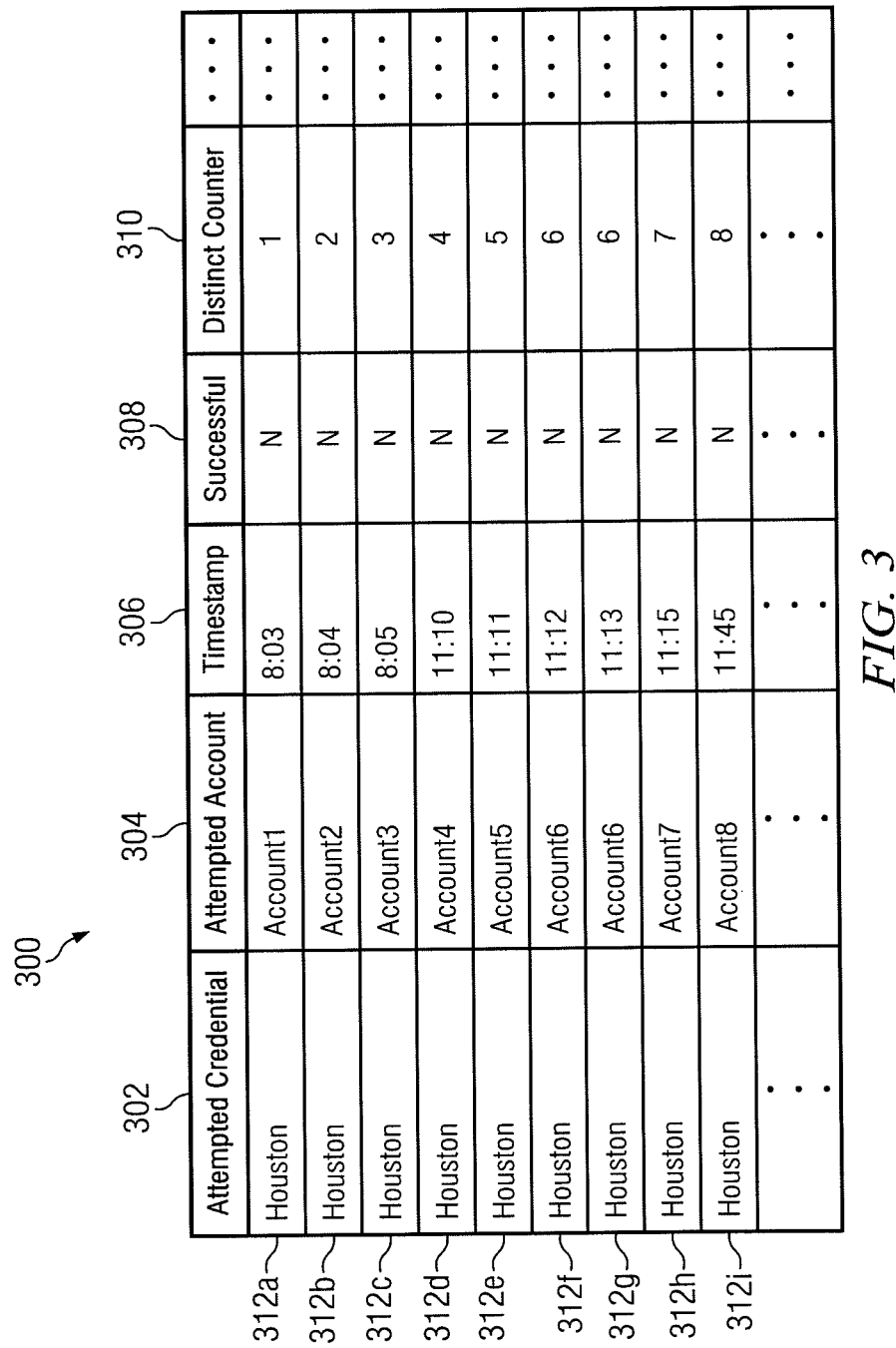
FIG. 3 illustrates example attempted user credentials data, which may be used by the example systems of FIG. 1, 4, or 5 for differentiating between malicious password guessing and honest mistakes, according to certain embodiments of the present disclosure.

FIG. 3 illustrates example attempted user credentials data, which may be used by the example systems of FIG. 1, 4, or 5 for differentiating between malicious password guessing and honest mistakes, according to certain embodiments of a present disclosure. Each attempted user credentials data entry corresponds to attempted user credentials. In this illustrated example, credentials verification system 100 is tracking the same attempted user credential being entered for a variety of user accounts 124. An example data set of FIG. 3 is attempted user credentials data 300, which represents attempted user credentials logged by authentication server 116. Generally, authentication server 116 uses attempted user credentials data 300 to determine if a malicious entity may have discovered a successful user credential but is trying to determine to which user account 124 the user credential is associated. It should be understood that attempted user credentials data 300 is provided for example purposes only. The example attempted user credentials data 300 will be described with reference to example credentials verification system 100. Attempted user credentials data 300 is depicted as having a tabular structure for illustrative purposes only. Attempted user credentials data 300 can be stored in a text file, a table in a relational database, a spreadsheet, a hash table, a linked list, or any other suitable data structure capable of storing information. In certain embodiments, attempted user credentials data 300 may be stored in password attempts 122. Each entry in attempted user credentials data 300 may or may not be assigned a unique identifier. It should be noted that although only clear text values readable by humans are shown in attempted user credentials data 300, credentials verification system 100 is capable of accommodating a variety of formatted data values including encrypted data values for increased security.

As an example, attempted user credentials data 300 of FIG. 3 may be discussed in conjunction with various components of the example system 100 of FIG. 1. Attempted user credentials data 300 of FIG. 3 may also be implemented in the example system 400 of FIG. 4 or the example system 500 of FIG. 5.

Generally, attempted user credentials data 300 contains various details about attempted user credentials received by authentication server 116. Attempted user credentials data 300 can contain any information about attempted user credentials that may be used to differentiate between malicious password guessing and honest mistakes by credentials verification system 100. For example, attempted user credentials data 300 may contain attempted user credential 302, account identifier 304, timestamp 306, result of authentication 308, and distinct counter 310. Records 312 are example entries of attempted user credentials data 300 where each record 312 corresponds to a particular attempt at using user credentials in credentials verification system 100. Although nine records 312 are illustrated, attempted user credentials data 300 can contain as many or as few records 312 as required to fulfill particular needs. Similarly, although only five data elements, depicted in the current example as columns, are shown in attempted user credentials data 300, attempted user credentials data 300 can contain as many or as few data elements are required to fulfill particular needs.

In certain embodiments, attempted user credential 302 represents a user credential that may have been entered in order to request authentication in credentials verification system 100. For example, attempted user credential 302 may be a user's name, a username, a password, an account name, a personal identification number, a social security number, a credit card number, any combination thereof, or any other data that can identify a user. In the illustrated example, record 312a contains attempted user credential 302 of "HOUSTON." Records 312b through 312i all also contain attempted user credential 302 of "HOUSTON."

In certain embodiments, account identifier 304 is a unique identifier that references a particular user account 124. Account identifier 304 may be a number, text string, or any other identifier capable of identifying a particular user account 124. In the current example, records 312 all include a text string as account identifier 304. For example, record 312a contains account identifier 304 for "Account1" which may be a reference to a particular user account 124. Record 312b contains account identifier 304 for "Account2" which may be a reference to a different user account 124. Records 312f and 321g contain the same account identifier of "Account6."

In certain embodiments, timestamp 306 represents a specific time that a particular user credential was attempted. For example, timestamp 306 may be a sequence of characters denoting a date and/or time. Timestamp 306 may be in any format for the date and/or time as require by particular needs. In certain embodiments, timestamp 306 may formatted according to the ISO 8601 time and date format. In certain embodiments, timestamp 306 may be the number of seconds since the UNIX epoch (defined as Jan. 1, 1970) until a user credential was attempted. In the illustrated example, timestamp 306 is depicted as time formatted in a human-readable format. For example, record 312a contains timestamp 306 of "8:03" and record 312b contains timestamp 306 of "8:04."

In certain embodiments, result of authentication 308 represents whether or not an attempted user credential 302 was successfully authenticated. Examples of result of authentication 308 may be a single binary digit, a number, a single character, a string of characters, or any other result of authentication 308 that is capable of denoting successful attempted user credentials from unsuccessful user credentials. For example, in the current example, result of authentication 308 contains a single letter: the letter "N" denoting an unsuccessful user credential or the letter "Y" denoting a successful user credential. For example, record 312a through 312i all contain result of authentication 308 of "N" denoting an unsuccessful user credential.

Generally, attempted user credentials data 300 may include one or more counters to keep track of distinct attempted user credentials. In the illustrated example, attempted user credentials data 300 includes one counter: distinct counter 310. In the illustrated example, distinct counter 310 may be initialized when the first record 312 for a particular attempted user credential 302 is created. Distinct counter 310 may keep track of distinct attempted account identifiers 304 for a particular attempted user credential 302. For example, in the illustrated example, distinct counter 310 keeps track of distinct account identifiers 304 for which attempted user credential 302 of "HOUSTON" was entered. In certain embodiments, distinct counter 310 may track distinct attempted account identifiers 304 for a particular attempted user credential 302 since the last successful attempted user credential, within the last hour, within the last day, or any other timeframe. For example, if a successful attempted user credential is entered for account 124, then distinct counter 310 may be reset to zero.

In the illustrated example, in record 312a, attempted user credential 302 of "HOUSTON" is attempted for account identifier 304 of "Account1" at timestamp 306 of "8:03." Authentication server 116 may determine that account identifier 304 is distinct for attempted user credential 302 of "HOUSTON" and may increment distinct counter 310 for record 312a to "1." Records 312b through 312f exemplify a similar process where attempted user credential 302 of "HOUSTON" was attempted for distinct account identifiers 304 and distinct counter 310 was incremented each time. In the illustrated example, in record 312g attempted user credential 302 of "HOUSTON" is attempted for account identifier 304 of "Account6" at timestamp 306 of "11:13." However, because record 312f indicates that user credential 302 of "HOUSTON" was already entered for account identifier 304 of "Account6," authentication server 116 may conclude that attempted user credential 302 in record 312g is not distinct and thus distinct counter for record 312g is not incremented, remaining in the current state of "6." Example records 312h and 312i are further examples of where credential 302 of "HOUSTON" was entered for distinct account identifiers 304.

In certain embodiments, there may be a threshold value for each counter of example attempted user credentials data 300. When a particular counter reaches its associated threshold value, then credentials verification system 100 may initiate a security policy. For example, example record 312i has distinct counter 310 entry of "8." An administrator of credentials verification system 100 may have preset a threshold value of ten for distinct counter 310 which may trigger a security policy. In this example, because distinct counter 310 is at "8" for record 312i, a security policy may not have been triggered. However, if the threshold value instead was eight, then a security policy would have been triggered.

FIG. 4 illustrates an example system for differentiating between malicious password guessing and honest mistakes. In the illustrated example credentials verification system 400 includes automated teller machine (ATM) 404 and authentication server 408. Although credentials verification system 400 is illustrated and primarily described as including particular components, the present disclosure contemplates credentials verification system 400 including any suitable components, according to particular needs.

Generally, credentials verification system 400 may be comprised of ATM 404 and authentication server 408. User 402 may attempt authentication at ATM 404. Therefore, user 402 may have to enter user credentials in ATM 404 before being granted access to various services. Although ATM 404 is depicted as an example for credentials verification system 400, credentials verification system 400 may be used in any environment where a user is requesting authentication for access to a service at a remote terminal.

ATM 404 may be any ATM 404 that is capable of taking the input of user credentials from user 402 and attempting to provide a service after authenticating user 402. For example, ATM 404 may have one or more processors, one or more memories, one or more displays, one or more keypads, one or more card readers, one or more network interfaces, or any other component useful for authenticating user 402.

User 402 may use various components of ATM 404 to enter user credentials to be authenticated before being granted access to particular services. User credentials may be any data that can identify a particular user 402 to ATM 404. For example, a user credential may be the user's name, a username, a password, an account name, an account number from an ATM card, a personal identification number, a social security number, a credit card number, any combination thereof, or any other data that can identify user 402. As described above in the detailed description of FIG. 1, in some embodiments, user credentials may be one of four varieties: credential, authentication claim, credential verifier, and credential identifier. In certain embodiments, user credentials may be the combination of a personal identification number and a user account number.

Once user 402 has entered user credentials, ATM 404 may communicate message 418 over network 406 to authentication server 408. Message 418 may contain the attempted user credentials, or it may contain information derived from the attempted user credentials, and a request to access a particular service of ATM 404.

Network 406 facilitates wireless or wireline communication. Network 406 may communicate, for example, IP packets, Frame Relay frames, Asynchronous Transfer Mode cells, voice, video, data, and other suitable information between network addresses. Network 406 may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

Generally, authentication server 408 receives user credentials and determines whether the user credentials are correct for the particular user 402. If the user credentials are correct, then authentication server 408 may confirm user 402 as authorized. Authentication sever 408 also may determine if a malicious entity is attempting to gain access to ATM 404 by password guessing or if a bona fide user is merely inputting incorrect user credentials. In particular, authentication server 408 comprises processor 410 and memory 412. Processor 410 may include one or more microprocessors, controllers, or any other suitable computing devices or resources. Processor 410 may work, either alone or with components of credentials verification system 400, to provide a portion or all of the functionality of credentials verification system 400 described herein. Processor 410 communicatively couples to memory 412. Memory 412 may take the form of volatile or non-volatile memory including, without limitation, magnetic media, optical media, RAM, ROM, removable media, or any other suitable memory component.

In certain embodiments, memory 412 may be internal or external to processor 410 and may include one or more instruction caches or one or more data caches. Instructions in the instruction caches may be copies of instructions in memory 412, and the instruction caches may speed up retrieval of those instructions by processor 410. Data in the data caches may include any suitable combination of copies of data in memory 412 for instructions executing at processor 410 to operate on; the results of previous instructions executed at processor 410 for access by subsequent instructions executing at processor 410, or for writing to memory 412; and other suitable data. The data caches may speed up read or write operations by processor 410.

In response to receiving message 418, authentication server 408 may facilitate communication between processor 410 and memory 412 to initiate the authentication of the attempted user credentials. In certain embodiments, authentication server 408 may initiate the authentication of the attempted user credentials by accessing user accounts 414. User accounts 414 is a collection of user credentials associated with user accounts, each user account associated with a particular user 402. For example, a particular user account 414 may comprise a unique user account identifier in addition to user credentials. In certain embodiments, the unique user account identifier may be a part of the user credentials. User accounts 414 may be stored in one or more text files, tables in a relational database, or any other suitable data structure capable of storing information. Authentication server 408 may use the attempted user credentials to retrieve a particular user account 414. Authentication server 408 may then compare the attempted user credentials to the user credentials of particular user account 414. For example, in certain embodiments, authentication server 408 may use an account number in the attempted user credentials to retrieve a particular user account 414 and then compare a personal identification number in the attempted user credentials to the personal identification number associated with user account 408. If the attempted user credentials match the user credentials of user account 414, then authentication server 408 may deem user 402 as authenticated and grant access to the services of ATM 404.

For particular attempted user credentials, authentication server 408 may store the attempted user credentials in memory 412. In the illustrated embodiment, authentication server 408 may store the attempted user credentials as part of password attempts 416. Password attempts 416 is a collection of user credentials communicated to authentication server 408. In certain embodiments, authentication server 408 may store every attempted user credential. In certain embodiments, authentication server 408 may store only select user credentials. Attempted user credentials may be stored in one or more text files, tables in a relational database, or any other suitable data structure capable of storing information. For example, password attempts 416 may be a table in a relational database. Although the example of storing password attempts is given, any attempted user credential may be stored in password attempts 416, as required by particular needs of credentials verification system 400. In certain embodiments, the information stored in password attempts 416 may be user account identifiers, attempted user credentials, time and date of attempted user credentials, result of authentication of attempted user credentials, one or more counters, or any other information that may be helpful in determining whether credentials verification system 400 is being accessed by a bona fide user or a malicious entity.

In addition to storing the attempted user credentials in password attempts 416, authentication server 408 may determine whether the attempted user credentials are distinct for the particular user account 414. For example, authentication server 408 may determine whether the attempted user credentials are distinct by utilizing a Bloom Filter. In certain embodiments, authentication server 408 may have counter 420 keeping track of distinct attempted user credentials for a particular user account 414. For example, counter 420 may be a field in password attempts 416. Authentication server 408 may compare the attempted user credentials against the user credentials associated with the particular account. If the attempted user credentials are distinct from the user credentials associated with the particular account, authentication server 408 may compare the attempted user credentials with other previously attempted user credentials for a particular account. In certain embodiments, if authentication server 408 determines the attempted user credentials are distinct from all previously attempted user credentials, then authentication server 408 may increment counter 420 associated with the particular user account 414. Authentication server 408 makes the determination of whether one user credential is distinct from another user credential based on a predefined user credential policy of credentials verification system 400. For example, if the predefined user credential policy is case-sensitive, then similar user credentials of different cases, such as the words "TEST" and "test," may be determined to be distinct. However, if the predefined user credential policy is not case-sensitive, then the user credentials of "TEST" and "test" may be determined not to be distinct. Once authentication server 408 determines that the attempted user credentials are distinct for a particular user account 414, authentication server 408 may increment counter 420 keeping track of distinct user credential attempts. If authentication server 408 determines that the attempted user credentials are not distinct to the correct user credentials associated with user account 414 or to previously attempted user credentials, then authentication server 408 may not increment counter 420 keeping track of distinct user credential attempts, thus counter 420 remains in its current state.

In certain embodiments authentication server 408 may track particular attempted user credentials being attempted for distinct user accounts 414. For example, a malicious user may have discovered a correct personal identification number, but not the particular user account 414 associated with that personal identification number. Thus, the malicious user may enter the same personal identification number for various user accounts 414. In such embodiments, authentication server 408 may store attempted user credentials in password attempts 416 or in another data structure capable of holding information in memory 412. For every distinct user account 414 attempted for a particular attempted user credential, authentication server 408 may increment counter 420. If authentication server 408 determines an attempted user account 414 is not distinct to a particular attempted user credential, then authentication server 408 may not increment the counter 420 associated with the particular attempted user credential, thus counter 420 remains in its current state.

In certain embodiments, authentication server 408 may associate multiple counters 420 for each user account 414. For example, there may be one counter 420, which is an instance counter 420, that keeps track of distinct attempted user credentials within a specific time period while a second counter 420, that is a lifetime counter 420, may keep track of distinct attempted user credentials over the lifetime of the particular user account 414. An example of a specific time period may be counter 420 that keeps track of distinct attempted user credentials since the last successful authentication of a particular user account 414. In such an embodiment, authentication server 408 may determine that particular attempted user credentials may be distinct when comparing the particular attempted user credentials with all other attempted user credentials for that particular account since the last successful authentication for that particular account, and, thus, may increment instance counter 420. However, authentication server 408 may determine that the particular attempted user credentials may not be distinct when comparing the particular attempted user credentials with all other attempted user credentials for that particular account over the lifetime of that particular account. In that instance, authentication server 408 may not increment lifetime counter 420, thus counter 420 remains in its current state. If authentication server 408 determines that the attempted user credentials match the user credentials associated with the particular user account 414, then authentication server 408 may reset instance counter 420 associated with the particular user account 414. For example, authentication sever 408 may reset instance counter 420 to 0.

In certain embodiments, authentication server 408 may have threshold values for counters 420 associated with user accounts 414. For example, a threshold value may be a number predefined by an administrator of credentials verification system 400 to determine whether the attempted user credentials that are being received are from a bona fide user that may be entering the user credentials incorrectly or by a malicious entity trying to guess the password to gain unauthorized access to credentials verification system 400. When a certain counter 420 associated with a particular user account 414 reaches or exceeds the threshold value, then a remediation action based on a security policy may be triggered. An example of a security policy may be to lock user accounts 414 that have at least one counter 420 that has exceeded the threshold value until further action is taken. Examples of further action is changing user credentials associated with user account 414, entering information in addition to user credentials, or replying to security questions. Another example of a security policy is contacting user 402 associated with a particular user account 414 regarding numerous incorrect attempted user credentials. User 402 may be contacted via phone, email, text message, or any other method of communication. A further example of a security policy is presenting user 402 with a CAPTCHA test that, for example, requires user 402 to input a series of text characters displayed in an image in addition to user credentials. Requiring user 402 to correctly answer the CAPTCHA test may serve the purpose of determining whether user 402 is really a malicious automated entity, or a malicious human-aided entity, incapable of correctly answering a CAPTCHA test. The security policy may be any one of the previous examples, a combination of the previous examples, or any other security policy suitable for particular needs of credentials verification system 400.

Any component of credentials verification system 400 may include an interface, logic, memory, and/or other suitable elements. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of credentials verification system 400.

Certain embodiments of the present disclosure may provide some, none, or all of the following technical advantages. For example, certain embodiments can differentiate between the password guessing of a malicious entity from a bona fide user that has mistakenly entered incorrect user credentials a few times by mistake. This can provide credentials verification system 400 with improved security and protection from malicious attacks while avoiding unnecessarily preventing bona fide users from accessing various services of ATM 404. This can help prevent a bona fide user from being frustrated from being unnecessarily locked out of his or her user account. Because certain embodiments may be able to more accurately detect malicious attacks, the resources required to address potential malicious attacks will be used more sparingly, improving efficiency and cutting costs associated with securing credentials verification system 400. Another advantage of certain embodiments is the heightened security and protection from a malicious entity learning of a correct user credential and then applying it to various user accounts to determine which account the user credentials may authorize. In certain embodiments, credentials verification system 400 may increase security by being able to detect a malicious entity that only guesses user credentials for a particular user account 414 over a prolonged period of time in hopes of avoiding triggering a time based user credential attempt limit. In certain embodiments, authentication server 408 may perform the same or similar functions as authentication server 116.

FIG. 5 illustrates an example system for differentiating between malicious password guessing and honest mistakes. In the illustrated example, credentials verification system 500 includes security system 504 and authentication server 508. Although credentials verification system 500 is illustrated and primarily described as including particular components, the present disclosure contemplates credentials verification system 500 including any suitable components, according to particular needs.

Generally, credentials verification system 500 may be comprised of security system 504 and authentication server 508. User 502 may attempt authentication at security system 504. Therefore, user 502 may have to enter user credentials in security system 504 before being granted access to various services. For example, user 502 may be trying to gain entry into a building through a secured door. Although security system 504 is depicted as an example for credentials verification system 500, credentials verification system 500 may be used in any environment where a user is requesting authentication for access to a service or location via a remote terminal.

Security system 504 may be any security system 504 that is capable of taking the input of user credentials from user 502 and attempting to provide a service after authenticating user 502. For example, security system 504 may have one or more processors, one or more memories, one or more displays, one or more keypads, one or more card readers, one or more network interfaces, or any other component useful for authenticating user 502.

User 502 may use various components of security system 504 to enter user credentials to be authenticated before being granted access to particular services. User credentials may be any data that can identify a particular user 502 to security system 504. For example, a user credential may be the user's name, a username, a password, an account name, an account number from an access card, a personal identification number, a social security number, a credit card number, any combination thereof, or any other data that can identify user 502. As described above in the detailed description of FIG. 1, in some embodiments, user credentials may be one of four varieties: credential, authentication claim, credential verifier, and credential identifier. In certain embodiments, user credentials may be the combination of a personal identification number and an account number.

Once user 502 has entered user credentials, security system 504 may communicate message 518 over network 506 to authentication server 508. Message 518 may contain the attempted user credentials, or it may contain information derived from the attempted user credentials, and a request to access a particular service of security system 504.

Network 506 facilitates wireless or wireline communication. Network 506 may communicate, for example, IP packets, Frame Relay frames, Asynchronous Transfer Mode cells, voice, video, data, and other suitable information between network addresses. Network 506 may include one or more personal area networks (PANS), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

Generally, authentication server 508 receives user credentials and determines whether the user credentials are correct for the particular user 502. If the user credentials are correct, then authentication server 508 may confirm user 502 as authorized credentials verification system 500. Authentication sever 508 also may determine if a malicious entity is attempting to gain access to security system 504 by password guessing or if a bona fide user is merely inputting incorrect user credentials. In particular, authentication server 508 comprises processor 510 and memory 512. Processor 510 may include one or more microprocessors, controllers, or any other suitable computing devices or resources. Processor 510 may work, either alone or with components of credentials verification system 500, to provide a portion or all of the functionality of credentials verification system 500 described herein. Processor 510 communicatively couples to memory 512. Memory 512 may take the form of volatile or non-volatile memory including, without limitation, magnetic media, optical media, RAM, ROM, removable media, or any other suitable memory component.

In certain embodiments, memory 512 may be internal or external to processor 510 and may include one or more instruction caches or one or more data caches. Instructions in the instruction caches may be copies of instructions in memory 512, and the instruction caches may speed up retrieval of those instructions by processor 510. Data in the data caches may include any suitable combination of copies of data in memory 512 for instructions executing at processor 510 to operate on; the results of previous instructions executed at processor 510 for access by subsequent instructions executing at processor 510, or for writing to memory 512; and other suitable data. The data caches may speed up read or write operations by processor 510.

In response to receiving message 518, authentication server 508 may facilitate communication between processor 510 and memory 512 to initiate the authentication of the attempted user credentials. In certain embodiments, authentication server 508 may initiate the authentication of the attempted user credentials by accessing user accounts 514. User accounts 514 is a collection of user credentials associated with user accounts, each user account associated with a particular user 502. For example, a particular user account 514 may comprise a unique user account identifier in addition to user credentials. In certain embodiments, the unique user account identifier may be a part of the user credentials. User accounts 514 may be stored in one or more text files, tables in a relational database, or any other suitable data structure capable of storing information. Authentication server 508 may use the attempted user credentials to retrieve a particular user account 514. Authentication server 508 may then compare the attempted user credentials to the user credentials of particular user account 514. For example, in certain embodiments, authentication server 508 may use an account number in the attempted user credentials to retrieve a particular user account 514 and then compare a personal identification number in the attempted user credentials to the personal identification number associated with user account 508. If the attempted user credentials match the user credentials of user account 514, then authentication server 508 may deem user 502 as authenticated and grant access to the services of security system 504.

For particular attempted user credentials, authentication server 508 may store the attempted user credentials in memory 512. In the illustrated embodiment, authentication server 508 may store the attempted user credentials as part of password attempts 516. Password attempts 516 is a collection of user credentials communicated to authentication server 508. In certain embodiments, authentication server 508 may store every attempted user credential. In certain embodiments, authentication server 508 may store only select user credentials. Attempted user credentials may be stored in one or more text files, tables in a relational database, or any other suitable data structure capable of storing information. For example, password attempts 516 may be a table in a relational database. Although the example of storing password attempts is given, any attempted user credential may be stored in password attempts 516, as required by particular needs of credentials verification system 500. In certain embodiments, the information stored in password attempts 516 may be user account identifiers, attempted user credentials, time and date of attempted user credentials, result of authentication of attempted user credentials, one or more counters 520, or any other information that may be helpful in determining whether credentials verification system 500 is being accessed by a bona fide user or a malicious entity.

In addition to storing the attempted user credentials in password attempts 516, authentication server 508 may determine whether the attempted user credentials are distinct for the particular user account 514. For example, authentication server 508 may determine whether the attempted user credentials are distinct by utilizing a Bloom Filter. In certain embodiments, authentication server 508 may have a counter 520 keeping track of distinct attempted user credentials for a particular user account 514. For example, counter 520 may be a field in password attempts 516. Authentication server 508 may compare the attempted user credentials against the user credentials associated with the particular account. If the attempted user credentials are distinct from the user credentials associated with the particular account, authentication server 508 may compare the attempted user credentials with other previously attempted user credentials for a particular account. In certain embodiments, if authentication server 508 determines the attempted user credentials are distinct from all previously attempted user credentials, then authentication server 508 may increment a counter 520 associated with the particular user account 514. Authentication server 508 makes the determination of whether one user credential is distinct from another user credential based on a predefined user credential policy of credentials verification system 500. For example, if the predefined user credential policy is case-sensitive, then similar user credentials of different cases, such as the words "TEST" and "test," may be determined to be distinct. However, if the predefined user credential policy is not case-sensitive, then the user credentials of "TEST" and "test" may be determined not to be distinct. Once authentication server 508 determines that the attempted user credentials are distinct for a particular user account 514, authentication server 508 may increment the counter 520 keeping track of distinct user credential attempts. If authentication server 508 determines that the attempted user credentials are not distinct to the correct user credentials associated with user account 514 or to previously attempted user credentials, then authentication server 508 may not increment the counter 520 keeping track of distinct user credential attempts, thus counter 520 remains in its current state.

In certain embodiments authentication server 508 may track particular attempted user credentials being attempted for distinct user accounts 514. For example, a malicious user may have discovered a correct personal identification number, but not the particular user account 514 associated with that personal identification number. Thus, the malicious user may enter the same personal identification number for various user accounts 514. In such embodiments, authentication server 508 may store attempted user credentials in password attempts 516 or in another data structure capable of holding information in memory 512. For every distinct user account 514 attempted for a particular attempted user credential, authentication server 508 may increment counter 520. If authentication server 508 determines an attempted user account 514 is not distinct to a particular attempted user credential, then authentication server 508 may not increment the counter 520 associated with the particular attempted user credential, thus counter 520 remains in its current state.

In certain embodiments, authentication server 508 may associate multiple counters 520 for each user account 514. For example, there may be one counter 520, which is an instance counter 520, that keeps track of distinct attempted user credentials within a specific time period while a second counter 520, that is a lifetime counter 520, may keep track of distinct attempted user credentials over the lifetime of the particular user account 514. An example of a specific time period may be a counter 520 that keeps track of distinct attempted user credentials since the last successful authentication of a particular user account 514. In such an embodiment, authentication server 508 may determine that particular attempted user credentials may be distinct when comparing the particular attempted user credentials with all other attempted user credentials for that particular account since the last successful authentication for that particular account, and, thus, may increment instance counter 520. However, authentication server 508 may determine that the particular attempted user credentials may not be distinct when comparing the particular attempted user credentials with all other attempted user credentials for that particular account over the lifetime of that particular account. In that instance, authentication server 508 may not increment lifetime counter 520, thus counter 520 remains in its current state. If authentication server 508 determines that the attempted user credentials match the user credentials associated with the particular user account 514, then authentication server 508 may reset instance counter 520 associated with the particular user account 514. For example, authentication sever 508 may reset instance counter 520 to 0.

In certain embodiments, authentication server 508 may have threshold values for counters 520 associated with user accounts 514. For example, a threshold value may be a number predefined by an administrator of credentials verification system 500 to determine whether the attempted user credentials that are being received are from a bona fide user that may be entering the user credentials incorrectly or by a malicious entity trying to guess the password to gain unauthorized access to credentials verification system 500. When a certain counter 520 associated with a particular user account 514 reaches or exceeds the threshold value, then a remediation action based on a security policy may be triggered. An example of a security policy may be to lock user accounts 514 that have at least one counter 520 that has exceeded the threshold value until further action is taken. Examples of further action is changing user credentials associated with user account 514, entering information in addition to user credentials, or replying to security questions. Another example of a security policy is contacting user 502 associated with a particular user account 514 regarding numerous incorrect attempted user credentials. User 502 may be contacted via phone, email, text message, or any other method of communication. A further example of a security policy is presenting user 502 with a CAPTCHA test that, for example, requires user 502 to input a series of text characters displayed in an image in addition to user credentials. Requiring user 502 to correctly answer the CAPTCHA test may serve the purpose of determining whether user 502 is really a malicious automated entity, or a malicious human-aided entity, incapable of correctly answering a CAPTCHA test. The security policy may be any one of the previous examples, a combination of the previous examples, or any other security policy suitable for particular needs of credentials verification system 500.

Any component of credentials verification system 500 may include an interface, logic, memory, and/or other suitable elements. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of credentials verification system 500.

Certain embodiments of the present disclosure may provide some, none, or all of the following technical advantages. For example, certain embodiments can differentiate between the password guessing of a malicious entity from a bona fide user that has mistakenly entered incorrect user credentials a few times by mistake. This can provide credentials verification system 500 with improved security and protection from malicious attacks while avoiding unnecessarily preventing bona fide users from accessing various services of security system 504. This can help prevent a bona fide user from being frustrated from being unnecessarily locked out of his or her user account. Because certain embodiments may be able to more accurately detect malicious attacks, the resources required to address potential malicious attacks will be used more sparingly, improving efficiency and cutting costs associated with securing credentials verification system 500. Another advantage of certain embodiments is the heightened security and protection from a malicious entity learning of a correct user credential and then applying it to various user accounts to determine which account the user credentials may authorize. In certain embodiments, credentials verification system 500 may increase security by being able to detect a malicious entity that only guesses user credentials for a particular user account 514 over a prolonged period of time in hopes of avoiding triggering a time based user credential attempt limit. In certain embodiments, authentication server 508 may perform the same or similar functions as authentication server 116.

Figure 6:
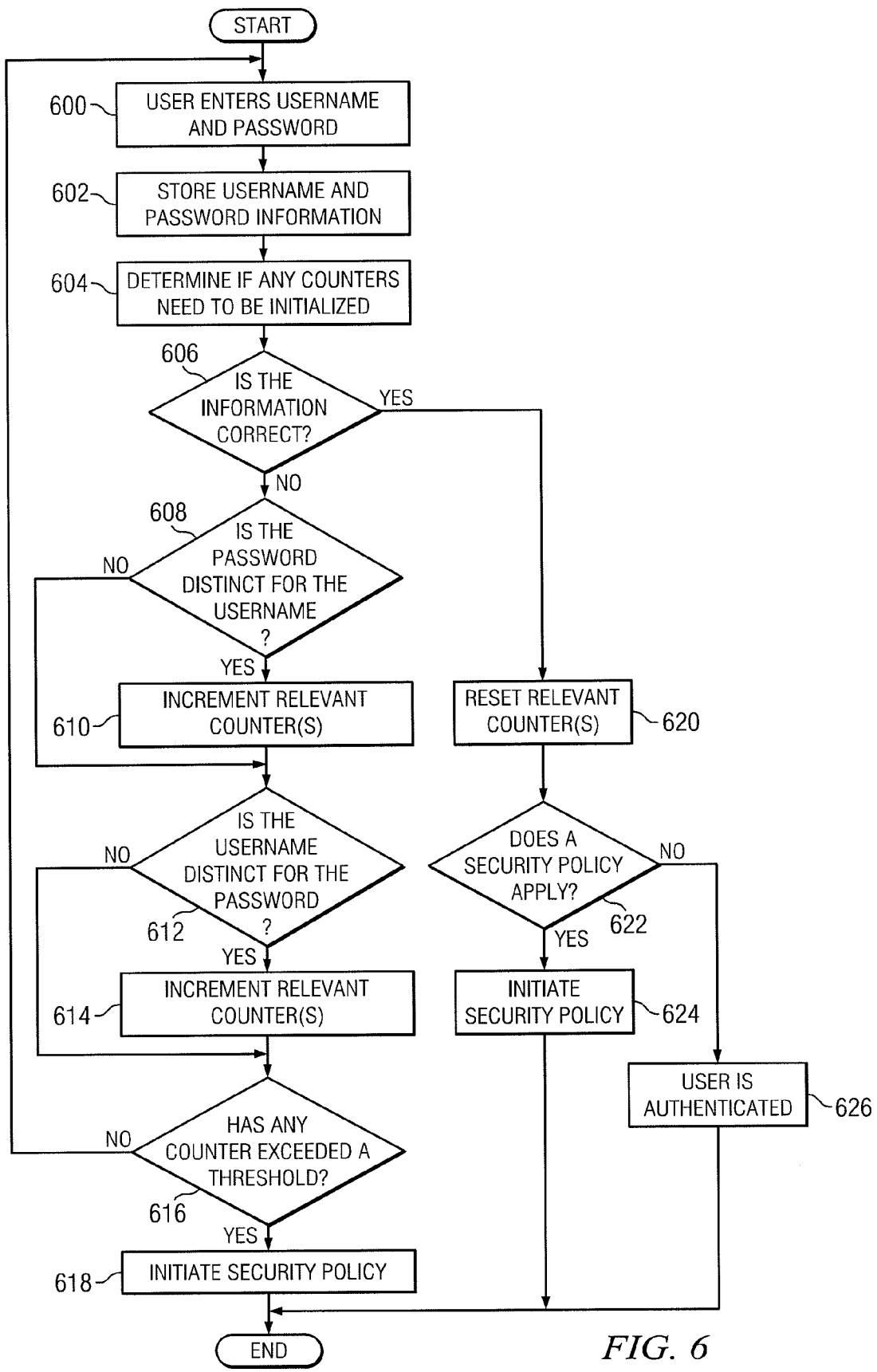
FIG. 6 illustrates an example method for differentiating between malicious password guessing and honest mistakes which may be performed by the example system 100 of FIG. 1, the example system 400 of FIG. 4, or the example system 500 of FIG. 5 according to certain embodiments of the present disclosure.

FIG. 6 illustrates an example method for differentiating between malicious password guessing and honest mistakes which may be performed by the example system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs. The same or similar methods as the example method of FIG. 6 can be performed by example the embodiments of FIGS. 4 and 5.

As an example, the example method of FIG. 6 will be discussed in conjunction with various components of the example system 100 of FIG. 1. The example method of FIG. 6 may also be implemented in the example system 400 of FIG. 4 or the example system 500 of FIG. 5.

At step 600, a user may use various components of computer 106 to enter user credentials to be authenticated before being granted access to services 118. For example, GUI 134 of computer 106 may display a prompt to the user to enter user credentials. User credentials may be any data that can identify a particular user to provisioned computing resources environment 104. For example, a user credential may be the user's name, a username, a password, an account name, a personal identification number, a social security number, a credit card number, any combination thereof, or any other data that can identify a user. In certain embodiments, user credentials may be the combination of a username and a password. Once a user has entered user credentials, computer system 106 may communicate message 114 over network 112 to authentication server 116. Message 114 may contain the attempted user credentials, or it may contain information derived from the attempted user credentials, and a request to access service 118 of provisioned computing resources environment 104.

At step 602, authentication server 116 may store the attempted user credentials in memory 122. In the illustrated embodiment, authentication server 116 may store the attempted user credentials as part of password attempts 126. Password attempts 126 is a collection of user credentials communicated to authentication server 116. In certain embodiments, authentication server 116 may store every attempted user credential. In certain embodiments, authentication server 116 may store only select user credentials. Attempted user credentials may be stored in one or more text files, tables in a relational database, or any other suitable data structure capable of storing information. For example, password attempts 126 may be a table in a relational database. Although the example of storing password attempts is given, any attempted user credential may be stored in password attempts 126, as required by particular needs of credentials verification system 100. In certain embodiments, the information stored in password attempts 126 may be user account identifiers, attempted user credentials, time and date of attempted user credentials, result of authentication of attempted user credentials, one or more counters 136, or any other information that may be helpful in determining whether credentials verification system 100 is being accessed by a bona fide user or a malicious entity.

At step 604, authentication server 116 may determine if any counters 136 need to be initialized. For example, a particular counter 136 that authentication server 116 needs to access may not currently exist or it may not contain a value, therefore authentication server 116 may create it and/or assign it an initial value of zero.

At step 606, in response to receiving message 114, authentication server 116 may facilitate communication between processor 120 and memory 122 to initiate the authentication of the attempted user credentials. In certain embodiments, authentication server 116 may initiate the authentication of the attempted user credentials by accessing user accounts 124. User accounts 124 is a collection of user credentials associated with user accounts. For example, a particular user account 124 may comprise a unique user account identifier in addition to user credentials. In certain embodiments, the unique user account identifier may be a part of the user credentials. User accounts 124 may be stored in one or more text files, tables in a relational database, or any other suitable data structure capable of storing information. Authentication server 116 may use the attempted user credentials to retrieve a particular user account 124. Authentication server 116 may then compare the attempted user credentials to the user credentials of particular user account 124. For example, in certain embodiments, authentication server 116 may use a username in the attempted user credentials to retrieve a particular user account 124 and then compare a password in the attempted user credentials to the password associated with user account 124. If the attempted user credentials match the user credentials of user account 124, then authentication server 116 may deem the user as authenticated and the example method may proceed to step 620. Otherwise, the example method may proceed to step 608.

At step 608, authentication server 116 may determine whether the attempted user credentials are distinct for the particular user account 124. In certain embodiments, authentication server 116 may have a counter 136 keeping track of distinct attempted user credentials for a particular user account 124. For example, counter 136 may be a field in password attempts 126. Authentication server 116 may compare the attempted user credentials against the user credentials associated with the particular account. If the attempted user credentials are distinct from the user credentials associated with the particular account, authentication server 116 may compare the attempted user credentials with other previously attempted user credentials for a particular account. Authentication server 116 makes the determination of whether one user credential is distinct from another user credential based on a predefined user credential policy of provisioned computing resources environment 104. For example, if the predefined user credential policy is case-sensitive, then similar user credentials of different cases, such as the words "TEST" and "test," may be determined to be distinct. However, if the predefined user credential policy is not case-sensitive, then the user credentials of "TEST" and "test" may be determined not to be distinct. Once authentication server 116 determines that the attempted user credentials are distinct for a particular user account 124, example system may proceed to step 610. If authentication server 116 determines that the attempted user credentials are not distinct to the correct user credentials associated with user account 124 or to previously attempted user credentials, then authentication server 116 may not increment the counter 136 keeping track of distinct user credential attempts, thus counter 136 remains in its current state and example method proceeds to step 612.

At step 610, authentication server 116 may increment the counter 136 keeping track of distinct user credential attempts.

At step 612, in certain embodiments authentication server 116 may track particular attempted user credentials being attempted for distinct user accounts 124. For example, a malicious user may have discovered a correct password, but not the particular user account 124 associated with that password. Thus, the malicious user may enter the same password for various user accounts 124. In such embodiments, authentication server 116 may store attempted user credentials in password attempts 126 or in another data structure capable of holding information in memory 122. If authentication server 116 determines an attempted user account 124 is not distinct to a particular attempted user credential, then authentication server 116 may not increment the counter 136 associated with the particular attempted user credential, thus counter 136 remains in its current state and example method proceeds to step 616. Else, example method proceeds to step 614. At step 614, for every distinct user account 124 attempted for a particular attempted user credential, authentication server 116 may increment counter 136.

In certain embodiments, authentication server 116 may associate multiple counters 136 for each user account 124. For example, there may be one counter 136, which is an instance counter 136, that keeps track of distinct attempted user credentials within a specific time period while a second counter 136, that is a lifetime counter 136, may keep track of distinct attempted user credentials over the lifetime of the particular user account 124. An example of a specific time period may be a counter 136 that keeps track of distinct attempted user credentials since the last successful authentication of a particular user account 124. In such an embodiment, authentication server 116 may determine that particular attempted user credentials may be distinct when comparing the particular attempted user credentials with all other attempted user credentials for that particular account since the last successful authentication for that particular account, and may proceed to step 614. However, authentication server 116 may determine that the particular attempted user credentials may not be distinct when comparing the particular attempted user credentials with all other attempted user credentials for that particular account over the lifetime of that particular account. In that instance, authentication server 116 may not increment lifetime counter 136 and proceed to step 616.

At step 614, authentication server 116 may increment the counter 136 keeping track of distinct user credential attempts.

At step 616, authentication server 116 may determine if any counter 136 has exceeded a threshold value. In certain embodiments, authentication server 116 may have threshold values for counters 136 associated with user accounts 124. For example, a threshold value may be a number predefined by an administrator of provisioned computing resources environment 104 to determine whether the attempted user credentials that are being received are from a bona fide user that may be entering the user credentials incorrectly or by a malicious entity trying to guess the password to gain unauthorized access to provisioned computing resources environment 104. When a certain counter 136 associated with a particular user account 124 reaches or exceeds the threshold value, then the example method may proceed to step 618. Otherwise, the example method may return to step 600.

At step 618, a remediation action based on a security policy may be triggered. An example of a security policy may be to lock user accounts 124 that have at least one counter 136 that has exceeded the threshold value until further action is taken. Examples of further action is changing user credentials associated with user account 124, entering information in addition to user credentials, or replying to security questions. Another example of a security policy is contacting the user associated with a particular user account 124 regarding numerous incorrect attempted user credentials. The user may be contacted via phone, email, text message, or any other method of communication. A further example of a security policy is presenting the user with a CAPTCHA test that, for example, requires the user to input a series of text characters displayed in an image in addition to user credentials. Requiring the user to correctly answer the CAPTCHA test may serve the purpose of determining whether the user is really a malicious automated entity, or a malicious human-aided entity, incapable of correctly answering a CAPTCHA test. The security policy may be any one of the previous examples, a combination of the previous examples, or any other security policy suitable for particular needs of provisioned computing resources environment 104. Example method may then skip to the end of the example method.

At step 620, if authentication server 116 determines that the attempted user credentials match the user credentials associated with the particular user account 124, then authentication server 116 may reset instance counter 136 associated with the particular user account 124. For example, authentication sever 116 may reset instance counter 136 to 0. Example method may proceed to step 622 where authentication server 116 may check if any other security policy may apply. For example, a user that may have entered correct user credentials may have a security policy associated with the particular user account 124 that requires a user credential change. If a security policy applies, then the example method may proceed to step 624. At step 624, the security policy may be initiated. Otherwise, the example method may proceed to step 626 where the user is authenticated to use services 118 of provisioned computing resources environment 104.

Figure 7:
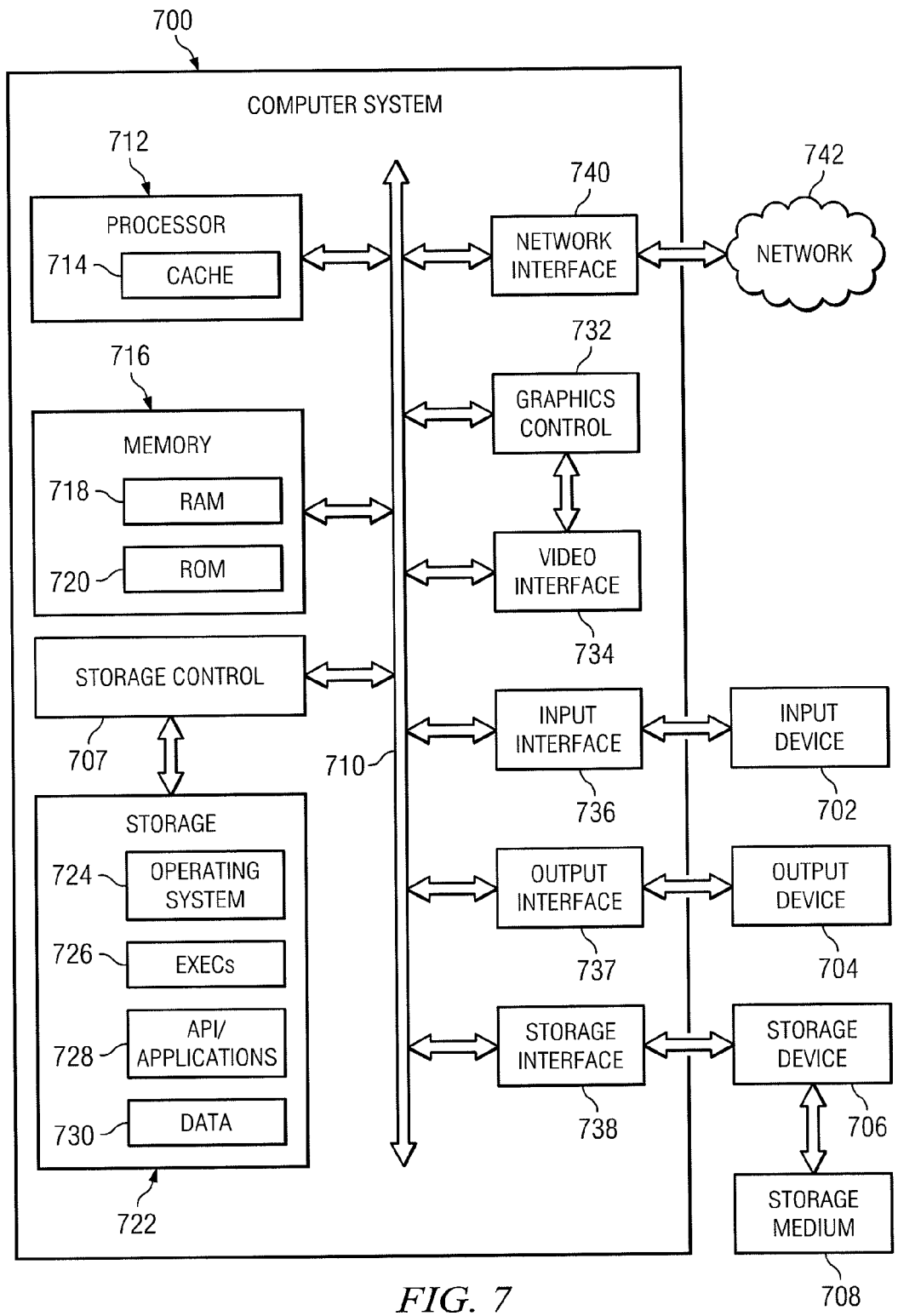
FIG. 7 illustrates an example computer system 700 that may be used for one or more portions of the example system 100 of FIG. 1, according to certain embodiments of the present disclosure.

FIG. 7 illustrates an example computer system 700 that may be used for one or more portions of the example system 100 of FIG. 1, according to certain embodiments of a present disclosure. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of computer 102, authentication server 116, and services 118 may be implemented using all of the components, or any appropriate combination of the components, of computer system 700 described below.

Computer system 700 may have one or more input devices 702 (which may include a keypad, keyboard, mouse, stylus, or other input devices), one or more output devices 704 (which may include one or more displays, one or more speakers, one or more printers, or other output devices), one or more storage devices 706, and one or more storage media 708. An input device 702 may be external or internal to computer system 700. An output device 704 may be external or internal to computer system 700. A storage device 706 may be external or internal to computer system 700. A storage medium 708 may be external or internal to computer system 700.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 712 (or central processing units (CPUs)). A processor 712 may contain a cache 714 for temporary local storage of instructions, data, or computer addresses. Processors 712 are coupled to one or more storage devices, including memory 716. Memory 716 may include RAM 718 and ROM 720. Data and instructions may transfer bi-directionally between processors 712 and RAM 718. Data and instructions may transfer uni-directionally to processors 712 from ROM 720. RAM 718 and ROM 720 may include any suitable computer-readable storage media.

Computer system 700 includes fixed storage 722 coupled bi-directionally to processors 712. Fixed storage 722 may be coupled to processors 712 via storage control unit 707. Fixed storage 722 may provide additional data storage capacity and may include any suitable computer-readable storage media. Fixed storage 722 may store an operating system (OS) 724, one or more executables (EXECs) 726, one or more applications or programs 728, data 730 and the like. Fixed storage 722 is typically a secondary storage medium (such as a hard disk) that is slower than primary storage. In appropriate cases, the information stored by fixed storage 722 may be incorporated as virtual memory into memory 716. In certain embodiments, fixed storage 722 may include network resources, such as one or more storage area networks (SAN) or network-attached storage (NAS).

Processors 712 may be coupled to a variety of interfaces, such as, for example, graphics control 732, video interface 734, input interface 736, output interface 737, and storage interface 738, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 740 may couple processors 712 to another computer system or to network 742. Network interface 740 may include wired, wireless, or any combination of wired and wireless components. Such components may include wired network cards, wireless network cards, radios, antennas, cables, or any other appropriate components. With network interface 740, processors 712 may receive or send information from or to network 742 in the course of performing steps of certain embodiments. Certain embodiments may execute solely on processors 712. Certain embodiments may execute on processors 712 and on one or more remote processors operating together.

In a network environment, where computer system 700 is connected to network 742, computer system 700 may communicate with other devices connected to network 742. Computer system 700 may communicate with network 742 via network interface 740. For example, computer system 700 may receive information (such as a request or a response from another device) from network 742 in the form of one or more incoming packets at network interface 740 and memory 716 may store the incoming packets for subsequent processing. Computer system 700 may send information (such as a request or a response to another device) to network 742 in the form of one or more outgoing packets from network interface 740, which memory 716 may store prior to being sent. Processors 712 may access an incoming or outgoing packet in memory 716 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 716 may include one or more tangible, computer-readable storage media embodying software and computer system 700 may provide particular functionality described or illustrated herein as a result of processors 712 executing the software. Memory 716 may store and processors 712 may execute the software. Memory 716 may read the software from the computer-readable storage media in mass storage device 716 embodying the software or from one or more other sources via network interface 740. When executing the software, processors 712 may perform one or more steps of one or more processes described or illustrated herein, which may include defining one or more data structures for storage in memory 716 and modifying one or more of the data structures as directed by one or more portions the software, according to particular needs.

In certain embodiments, the described processing and memory elements (such as processors 712 and memory 716) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:
1. A system comprising:
a memory configured to:
 store a credential verifier associated with a user account;
 store a lifetime counter, the lifetime counter associated with the user account; and
 store an instance counter, the instance counter associated with the user account; and
a processor communicatively coupled to the memory, the memory including executable instructions that upon execution cause the system to:
 receive a first authentication attempt;
 increment the lifetime counter and the instance counter if validation of the first authentication attempt against the credential verifier fails;
 receive a second authentication attempt;
 increment the lifetime counter and the instance counter only if validation of the second authentication attempt against the credential verifier fails and the second authentication attempt is distinct from the first authentication attempt;
 authenticate the user account if validation of the first authentication attempt succeeds;

reset the instance counter in response to authenticating the user account; and allow the lifetime counter to remain in a current state in response to authenticating the user account.

2. The system of claim 1, the memory further comprising instructions that upon execution cause the system to determine whether the instance counter has reached a threshold count and execute actions identified by a pre-defined security policy if the instance counter has reached the threshold count.

3. The system of claim 2, wherein the pre-defined security policy comprises requiring a modification to a user credential associated with the user account.

4. The system of claim 2, wherein the pre-defined security policy comprises communicating a message to a user associated with the user account.

5. The system of claim 4, wherein communicating a message comprises at least one of:
- sending an email to an email account, the email account associated with the user account;
- sending a text message to a cellular device, the cellular device associated with the user account; and/or
- calling a voice communication device, the voice communication device associated with the user account.

6. The system of claim 1, wherein the first authentication attempt is a result of a function applied to a first attempted user credential.

7. The system of claim 1, wherein the credential verifier is a result of a function applied to a user credential, the user credential associated with the user account.

8. The system of claim 7, wherein the user credential is a selected one of a group of user credential types, the group consisting of:
- an account name;
- a username;
- a password;
- a personal identification number;
- a social security number; or
- a credit card number.

9. The system of claim 1, the memory further to store a bloom filter associated with the instance counter and wherein determining whether the second authentication attempt is distinct from the first authentication attempt comprises:
- determining whether the second authentication attempt is matched by the bloom filter; and
- storing a representation of the second authentication attempt using the bloom filter if matching the second authentication by the bloom filter fails.

10. A method comprising:
- storing a credential verifier associated with a user account;
- storing a lifetime counter, the lifetime counter associated with the user account;
- storing an instance counter, the instance counter associated with the user account;
- receiving a first authentication attempt;
- incrementing the lifetime counter and the instance counter if validation of the first authentication attempt against the credential verifier fails;
- receiving a second authentication attempt;
- incrementing the lifetime counter and the instance counter only if validation of the second authentication attempt against the credential verifier fails and the second authentication attempt is distinct from the first authentication attempt;
- authenticating the user account if validation of the first authentication attempt succeeds;
- resetting the instance counter in response to authenticating the user account; and
- allowing the lifetime counter to remain in a current state in response to authenticating the user account.

11. The method of claim 10 further comprising determining whether the instance counter has reached a threshold count and executing actions identified by a pre-defined security policy if the instance counter has reached the threshold count.

12. The method of claim 11, wherein the pre-defined security policy comprises requiring a modification to a user credential associated with the user account.

13. The method of claim 11, wherein the pre-defined security policy comprises communicating a message to a user associated with the user account.

14. The method of claim 13, wherein communicating a message comprises at least one of:
- sending an email to an email account, the email account associated with the user account;
- sending a text message to a cellular device, the cellular device associated with the user account; and/or
- calling a voice communication device, the voice communication device associated with the user account.

15. The method of claim 10, wherein the first authentication attempt is a result of a function applied to a first attempted user credential.

16. The method of claim 10, wherein the credential verifier is a result of a function applied to a user credential, the user credential associated with the user account.

17. The method of claim 16, wherein the user credential is a selected one of a group of user credential types, the group consisting of:
- an account name;
- a username;
- a password;
- a personal identification number;
- a social security number; or
- a credit card number.

18. The method of claim 10, further comprising storing a bloom filter associated with the instance counter and wherein determining whether the second authentication attempt is distinct from the first authentication attempt comprises:
- determining whether the second authentication attempt is matched by the bloom filter; and
- storing a representation of the second authentication attempt using the bloom filter if matching the second authentication by the bloom filter fails.

19. The method of claim 18, wherein determining whether the second authentication attempt is distinct from the first authentication attempt comprises:
- not storing the representation of the second authentication attempt using the bloom filter if matching the second authentication by the bloom filter is successful.

20. A system comprising:
a memory configured to:
- store a user credential, the user credential associated with a user account;
- store a lifetime counter, the lifetime counter associated with the user account; and
- store an instance counter, the instance counter associated with the user account; and a processor communicatively coupled to the memory, the memory including executable instructions that upon execution cause the system to:
- access a first attempted user credential;
- access a second attempted user credential;
- access a third attempted user credential;
- compare the first attempted user credential to the user credential;

compare the second attempted user credential to the user credential and the first attempted user credential;

compare the third attempted user credential to the user credential, the first attempted user credential, and the second attempted user credential;

increment the lifetime counter and the instance counter if the first attempted user credential is distinct from the user credential;

allow the lifetime counter and instance counter to remain in a current state if the second attempted user credential is distinct from the user credential and the second attempted user credential matches the first attempted user credential; and increment the lifetime counter and the instance counter if the third attempted user credential is distinct from the user credential, the third attempted user credential is distinct from the first attempted user credential, and the third attempted user credential is distinct from the second attempted user credential;

authenticate the user account if the first attempted user credential matches the user credential;

reset the instance counter in response to authenticating the user account; and allow the lifetime counter to remain in a current state in response to authenticating the user account.

21. The system of claim 20, the memory further comprising instructions that upon execution cause the system to determine whether the instance counter has reached a threshold count and execute actions identified by a pre-defined security policy if the instance counter has reached the threshold count.

22. The system of claim 21, wherein the pre-defined security policy comprises communicating a message to a user associated with the user account.

23. The system of claim 22, wherein communicating a message comprises at least one of:
   sending an email to an email account, the email account associated with the user account;
   sending a text message to a cellular device, the cellular device associated with the user account; and
   calling a voice communication device, the voice communication device associated with the user account.

24. The system of claim 20 wherein the user credential is a selected one of a group of user credential types, the group consisting of:
   an account name;
   a username;
   a password;
   a personal identification number;
   a social security number; or
   a credit card number.

* * * * *